United States Patent
Maruyama

(10) Patent No.: US 6,962,340 B2
(45) Date of Patent: Nov. 8, 2005

(54) MECHANICAL SEAL DEVICE

(75) Inventor: Hideki Maruyama, Takahashi (JP)

(73) Assignee: Eagle Industry Co., Ltd., Tokyo (JP)

( * ) Notice: Subject to any disclaimer, the term of this patent is extended or adjusted under 35 U.S.C. 154(b) by 64 days.

(21) Appl. No.: 10/420,718

(22) Filed: Apr. 23, 2003

(65) Prior Publication Data

US 2004/0036228 A1 Feb. 26, 2004

(30) Foreign Application Priority Data

Apr. 24, 2002 (JP) ........................................ 2002-121784

(51) Int. Cl.[7] .............................................. F18J 15/38
(52) U.S. Cl. ........................ 277/370; 277/390; 277/391; 277/392
(58) Field of Search ................................ 277/370, 390, 277/391, 392, 393

(56) References Cited

U.S. PATENT DOCUMENTS 6,523,832 B1 * 2/2003 Nakano ....................... 277/370
6,655,694 B1 * 12/2003 Nakano ....................... 277/370

* cited by examiner

Primary Examiner—Enoch Peavey
(74) Attorney, Agent, or Firm—Arent Fox, PLLC

(57) ABSTRACT

A primary technical goal of the present invention is to improve the durability and the seal performance of a cup gasket for a mechanical seal device which retains a seal ring. The mechanical seal device disposes a cup gasket made of a resilient rubber material between the mounting surface of the first seal ring and the step shoulder installation surface in which the cup gasket retains a support plate in an integral manner and the support face of the support plate facing opposite relative to and in approximately parallel with the mounting surface of the seal ring.

4 Claims, 7 Drawing Sheets

MECHANICAL SEAL DEVICE

BACKGROUND OF THE INVENTION

1. Field of the Invention

The present invention relates generally to a mechanical seal device with an enhanced seal performance and durability used for pumps or the like. More particularly, the invention relates to a mechanical seal device which provides a seal against a process fluid under a high pressure and exhibits an improved durability of seal rings.

2. Description of the Related Art

There has been a mechanical seal device as a relative art of the present invention, as shown in FIG. 6.

FIG. 6 shows a half sectional view of the mechanical seal device 100 being used for a pump.

In this mechanical seal device 100, an apparatus interior side F defines a sealed process fluid region dealing with water or the like while an external side T which is opposite to the apparatus interior side F defines a region of lubricant oil or atmosphere.

This mechanical seal 100 is disposed between a housing 102 and a rotary shaft 103. A rotary body 104 which is connected with the rotary shaft 103 retains a step shoulder 104A. The step shoulder 104A is disposed at the end portion 104C within an inner circumferential surface 104B of the rotary body 104. The inner diameter surface 104B needs to be made large in diameter. Therefore, it is difficult to enforce a large width for a radially extending surface 104D of the step shoulder 104A. A rotary seal ring 106 is installed within the step shoulder 104A via a cup gasket 105. The inner diameter surface 105A of the cup gasket 105 is made smaller than the inner circumferential surface 104B of the rotary body 104 according to the size of the rotary seal ring 106.

A stationary seal ring 107 which is disposed opposite to the rotary seal ring 106 and forms a sealing contact therewith is fitted to a casing 108 in a movable manner. The casing 108 then is fitted to a housing 102. And the stationary seal ring 107 is resiliently urged toward the rotary seal ring 106 by a spring 111. The spring 111 disposes annular spring seats 110, 110 on its both ends whose cross section is L-shaped. Furthermore, the spring seats 110, 110 are disposed between the two end flanges of a flexible diaphragm 109 which has a cylindrical shape and whose middle portion is bent for providing flexibility.

The mechanical seal device 100 thus formed provides a seal against a process fluid by establishing a sealing contact between the cup gasket 105 and the contact surface of the step shoulder 104A even under a process fluid pressure exerted from the direction of the apparatus body side F. Moreover, the cup gasket 105 resiliently supports the rotary seal ring 106 and urges a sealing contact for the seal face 106A of the rotary seal ring 106.

The cup gasket 105, however, is squeezed between the hardened rotary seal ring 106 and rotary body 104 due to the process fluid pressure, and this will lead to a formation of fracture plane 105X as shown in FIG. 7. This kind of damage to the cup gasket 105 will result in an unstable behavior of the mating surface. This will yield not only an immature contact of the seal face 106A but also leakage of the process fluid.

The cup gasket even being made of a high strength rubber material is constantly subjected to a high pressure via the rotary seal ring 106 and will end up with a failure due to its decreased durability.

There exists another prior art in which the cup gasket 105 is replaced by an O-ring. However, use of O-ring is problematic in terms of its seal performance at the respective interfaces of the O-ring with the rotary seal ring 106 and the rotary body 104. That is, with such an O-ring installed, the rotary seal ring 106 is directly fitted to the step shoulder of the rotary body 104 without a resilient support. Therefore, a seal performance of a seal face 106A of the rotary seal ring 106 will deteriorate when the seal face 106A with the rotary body 104 becomes eccentric as they rotate together. Furthermore, eccentricity of the rotary seal ring 106 which is fitted to the rotary body 104 but is not resiliently supported is prone to eccentricity of the seal face 106A, which in turn induces an uneven wear of the seal face 106A and a decrease of its seal performance.

The present invention is introduced to resolve the above mentioned problems. A primary technical goal which this invention tries to achieve is to provide a mechanical seal in which durability of a cup gasket supporting seal rings is enhanced.

Another goal is to improve a seal performance of the seal face of the seal ring by means of a support given by a cup gasket. Yet another goal is to simplify the installation of the cup gasket and the seal rings.

SUMMARY OF THE INVENTION

A primary object of the present invention is to resolve the above mentioned technical problems, and a solution to such problems is embodied as follows.

A preferred embodiment of a mechanical seal device constructed in accordance with the principles of the present invention is a mechanical seal device wherein a first seal ring installed in a rotary body and a second seal ring installed in a seal housing establish a sealing contact at the respective seal faces providing a seal against a high pressure process fluid, one of the seal rings retaining a contact face at which the seal ring is fixed relative to a step shoulder installation surface and a seal face in the opposite to the contact face, a cup gasket made of resilient rubber material being disposed between the contact face and the step shoulder installation surface, the cup gasket integrally retaining a support plate in which a support face of the plate is disposed approximately in parallel to the contact face of the oppositely facing seal ring.

In the mechanical seal device as an embodiment of the present invention, the resilient nature of the rubber made cup gasket makes it difficult to fit the cup gasket itself to the step shoulder installation surface. However, the support plate retained in the gasket in an integral manner simplifies the fitting of the contact face to the step shoulder installation surface.

The support plate disposed in the cup gasket provides a support for the seal ring against the process fluid pressure even when the seal ring is subjected to a repetitive pressure of the process fluid. Therefore, it effectively prevents a possible damage to the rubber material of the cup gasket.

Since the support plate does not reach over the outer circumferential surface of the cup gasket, the cup gasket exhibits a sufficient seal performance by resiliently forming a sealing contact with the inner circumferential surface of the step shoulder installation surface.

DETAILED DESCRIPTION OF THE INVENTION

Described below is details of the figures of a preferred embodiment of a mechanical seal device constructed in accordance with the principles of the present invention. All the figures explained below are constructed according to actual design drawings with accurate dimensional relations.

Figure 1:
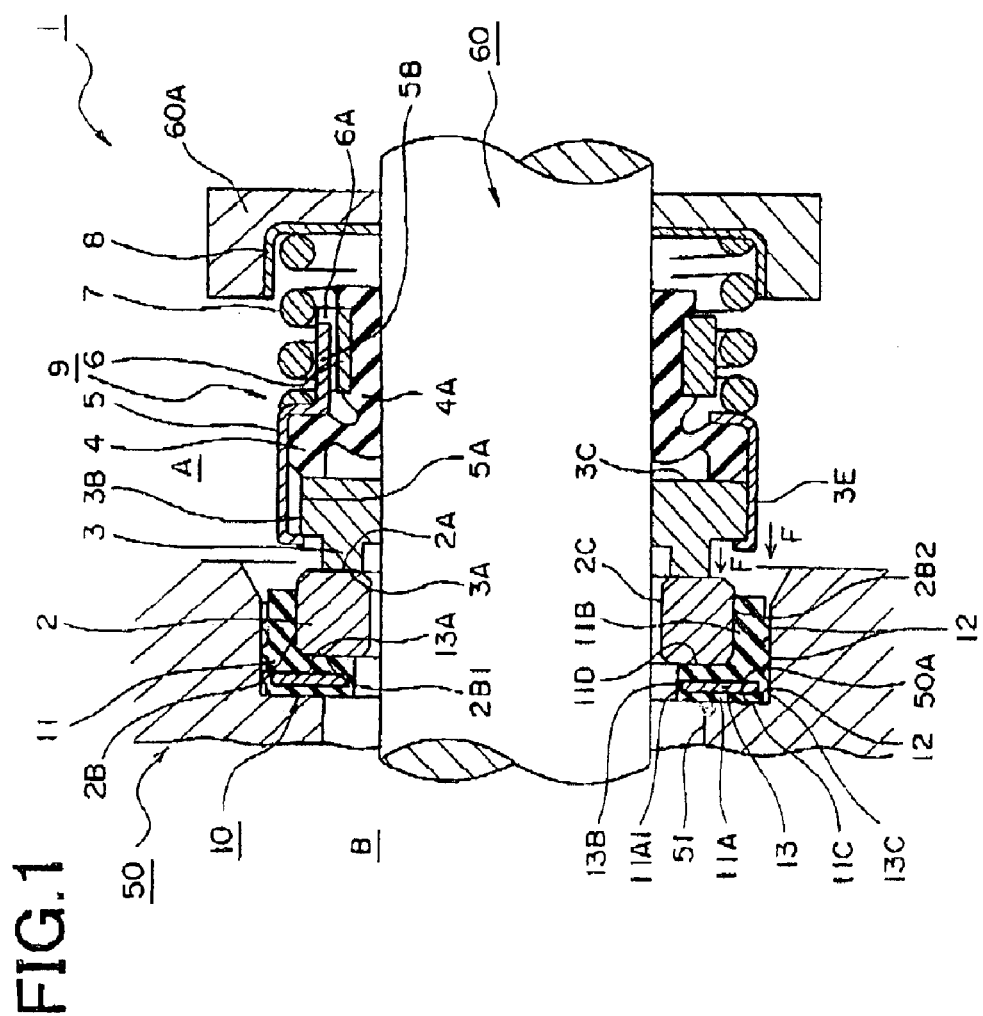
FIG. 1 is a cross sectional view of a mechanical seal device as a first embodiment related to the present invention.

In FIG. 1, a mechanical seal device 1 is mainly comprised of a first seal ring 2, a cup gasket 10 being disposed in the first seal ring 2, a second seal ring 3 oppositely facing the first seal ring 2, a resiliently urging means comprising a bellows 4 and a spring 7 for resiliently supporting the second seal ring 3, and an annular connection ring 5 for joining the second seal ring 3 and the bellows 4.

The first seal ring 2 has a rectangular section and an annular body. A first seal face 2A is located at one end face of the annular body in its axial direction. The other end face 2B1 of the first seal ring 2 located opposite to the first seal face 2A and its outer circumferential surface 2B2 define a contact surface 2B whose cross-section is L-shaped. In addition, the inner diameter surface 2C of the first seal ring 2 is made larger than the outer diameter of a rotary shaft 60. Therefore, a certain clearance is developed between the first seal ring 2 and the rotary shaft 60.

The first seal ring 2 is made of a hard material. For example, the material includes silicon carbide, ceramics, super-hard alloys, carbon materials and so on.

A housing 50 disposes a step shoulder installation surface 50A for mounting the first seal ring 2. The step shoulder installation surface 50A retains a radially extending surface and an axially extending circumferential surface. Therefore the step shoulder installation surface 50A has an annular form. The radially extending surface of the step shoulder installation surface 50A has a through hole with an inner diameter surface 51 or a concave inner diameter surface 51 which is not shown in the figure whose axis coincides with the center axis of the step shoulder installation surface 50A.

A cup gasket is disposed between the step shoulder installation surface 50A and the first seal ring 2. The cup gasket 10 consists of a main body 11 being made of a resilient material such as rubber or resin and a support plate being made of a hard material. The main body 11 has a cylindrical cup shape with a hole at its bottom whose half cut-away section is L-shape. The main body 11 comprises a holed bottom plate 11A and a cylindrical wall 11B. The outer mating surface 11C of the L-shaped main body 11 closely mates with the oppositely facing step shoulder installation surface 50A while the inner mating surface 11D closely mates with the contact surface 2B of the first seal ring 2.

And the axially extending circumferential portion of the outer mating surface 11C retains a plurality of annularly protruding seal portions 12, 12, 12 so that a close contact of the seal portions 12, 12, 12 relative to the step shoulder installation surface 50A provides a sealing function.

The diameter X1 of the inner diameter surface 11A1 of the holed bottom plate 11A of the main body 11 is made smaller than the diameter D3 of the inner diameter surface 51 of the housing 50. Also the outer circumference diameter of the cylinder tube portion 11B is deliberately chosen such that the seals 12 provide a sealing contact after an elastic deformation by taking an interference into account. That is, the outer circumference diameter of the cylinder tube portion 11B in an unconstrained form is made slightly larger than the inner diameter X2 of the step shoulder installation surface by the amount of the interference.

The main body 11 is preferably made of a rubber material such as FKM, NBR, IIR, U, Q, CR and so on.

The support plate 13 is embedded in the holed bottom plate 11A of the main body 11.

Figure 2:
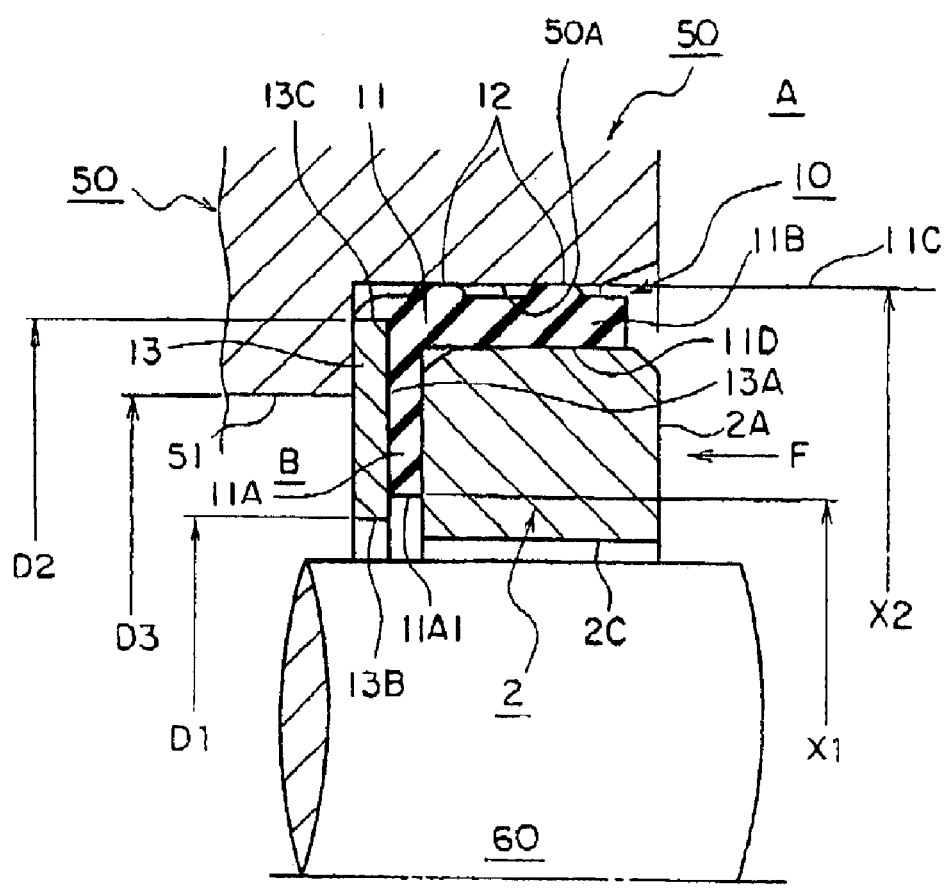
FIG. 2 is a half cut-away sectional view of a portion of a mechanical seal device as a second embodiment related to the present invention.

The support plate 13 has an annular ring form and retains an inner diameter surface 13B and an outer diameter surface 13C. The planar form of the support plate 13 is hexagonal, elliptical, or provided with slits prepared on the inner circumference or the outer circumference. As shown in FIG. 2, the diameter of the inner diameter surface 13B is D1 while that of the outer diameter surface 13C is D2. And the side face of the support plate 13 defines a working face 13A which is arranged so as to sustain the process fluid pressure in parallel to the first seal ring 2. Furthermore, the support plate 13 retains axial through holes which are not shown in the figure. A material used for the holed bottom plate 11A partially penetrates into the through holes in a vulcanizing process of the holed bottom plate 11A and is connected with the opposite side face at the other end of the through holes. This yields a strong connection of the support plate 13 and the holed bottom plate 11A.

It is seen in FIG. 1 that the diameter X1 of the inner diameter surface 11A1 of the main body 11 and the diameter D1 and other dimensions of the inner diameter surface 13B of the support plate 13 are exhibited somewhat small. In the actual dimensional relationship, however, the diameter D1 of the inner diameter surface 13B of the support plate 13 is at least smaller than the diameter D3 of the inner diameter surface 51 of the through hole and larger than the diameter of the inner diameter surface 2C of the first seal ring 2.

This support plate 13 is a reinforcing element being made of iron, steel, stainless steel, aluminum, resin and so on.

The second seal ring 3 retains a convex portion which protrudes in an axial direction and defines a second seal face 3A therein forming a close contact with the first seal face 2A of the first seal ring 2. For the second seal ring 3, its inner diameter surface is fitted over the rotary shaft 60 in a freely slidable manner while its outer diameter surface disposes a plurality of stopper grooves 3B. The opposite side of the second seal face 3A of the second seal ring 3 defines a contact face 3C against which one end of the bellows 4 is pressed.

Furthermore, the cross section of the bellows 4 is partially bent in a Z-shape and its front end is pressed against the contact face 3C. And the cylindrical portion 4A located in the inner circumferential side of the bellows 4 is fitted over the rotary shaft 60. A retainer ring 6 is integrally disposed in the outer circumferential portion of the cylindrical portion 4A wherein an axially extending concave stopper 6A is disposed.

A joint ring 5 is fitted over the outer diameter surface of the bellows 4 as well as the second seal ring 3 in such a way that the front end of the bellows 4 is pressed toward the contact face 3C of the second seal ring 3 and the second seal ring 3 rotates with the bellows 4 in an integral manner.

Both ends of the joint ring 5 are bent inwardly such that the front end of the bellows 4 keeps a sealing contact with the contact face 3C of the second seal ring 3. Also a protruding portion 5A disposed in a portion of the joint ring 5 which is located outward relative to the second seal ring 3 engages with the stopper groove 3B of the second seal ring 3. The opposite end of the joint ring 5 retains a plurality of protruding plates 5B which are equally spaced in a circumferential direction and engage with the concave stoppers 6A of the retainer ring 6A.

A spring support ring 8 whose cross section is an L-shape is securely fitted to the shoulder part of the rotary body 60A which is fixed with the rotary shaft 60. A spring 7 which is supported by the spring support ring 8 makes a contact with a spring receiving surface of the joint seal ring 5 which is bent inward to ensure a resiliently urging force.

In the mechanical seal device 1 thus constructed, the second seal face 3A of the second seal ring 3, which is urged by a resiliently urging means 9 comprising attachment components such as bellows 4, spring 7, joint ring 5 and so on, sealingly contacts with the opposing first seal face 2A of the first seal ring 2.

And when the process fluid pressure acts upon the cylinder tube portion 11B, the support plate 13 disposed in the cup gasket 10 supports the cylinder tube portion 11B in an axial direction and induces an elastic deformation of the cylinder tube portion 11B in a radial direction for improving the seal performance of the cylinder tube portion 11B.

In particular, in case that the cylinder tube portion 11B disposes a seal portion 12, the presence of the support plate 13 enhances the seal performance of the seal portion 12 by avoiding an unwanted deformation of the seal portion 12.

The support plate 13 disposed in the cup gasket 10 enables the first seal face 2A of the first seal ring 2 to form a sealing contact with the second seal face 3A via the resilient rubber material of the holed bottom plate 11A in which the first seal face 2A approaches the second seal face 3A in a parallel manner. Therefore, an uneven wear of the first seal face 2A can be prevented.

A mechanical seal device 1 as a second embodiment of the present invention shown in FIG. 2 and FIG. 3 will be described next.

The overall construction of the mechanical seal device 1 is similar to that of the mechanical seal device 1 shown in FIG. 1.

A difference between the mechanical seal device 1 of FIG. 1 and that of FIG. 2 is the construction of the cup gasket 10. In FIG. 2, the diameter D1 of the inner diameter surface 13B of the support plate 13 is made smaller than the diameter X1 of the inner diameter surface 11A1 of the main body 11. The support plate 13 is partially exposed so as to have a similar surface area to that of the radially extending surface of the holed bottom plate 11A of the main body 11 which is located in the lower pressure side B. The diameter D1 of the inner diameter surface 13B of the support plate 13 is made larger than the diameter of the inner diameter surface 2C of the first seal ring 2 as well as smaller than the diameter D3 of the inner diameter surface 51 of the through hole.

The holed bottom plate 11A is supported by the support plate 13 such that the bottom plate 11A is not directly supported by the step shoulder installation surface 50A. This arrangement allows the diameter D3 of the through hole 51 of the housing 50 to be formed large so that it gives more freedom to the design of the housing 50 and the rotary elements disposed within the housing 50.

Also the cylinder tube portion 1B retains a couple of the seal portions 12. And the seal portions 12 being fittingly mated with the step shoulder installation surface 50A are compressed by approximately one third as shown in FIG. 2. Furthermore, the diameter D1 of the inner diameter surface 13B of the support plate 13 should preferably be in a range of from the diameter of the inner diameter surface 2C of the first seal ring 2 to the diameter of the inner diameter surface 51 of the through hole.

This arrangement of the cup gasket 10 can enhance the durability of the cup gasket 10 by securely supporting the holed bottom plate 11A.

Furthermore, the disposition of the support plate 13 helps to install the mechanical seal device 1 safely even under a case in which the diameter D3 of the inner diameter surface 51 of the through hole is chosen smaller than the diameter X2 of the inner diameter surface 11A1 of the holed bottom plate 11A. This will lead to not only failure prevention but also a compact design of the mechanical seal device 1.

Figure 3:
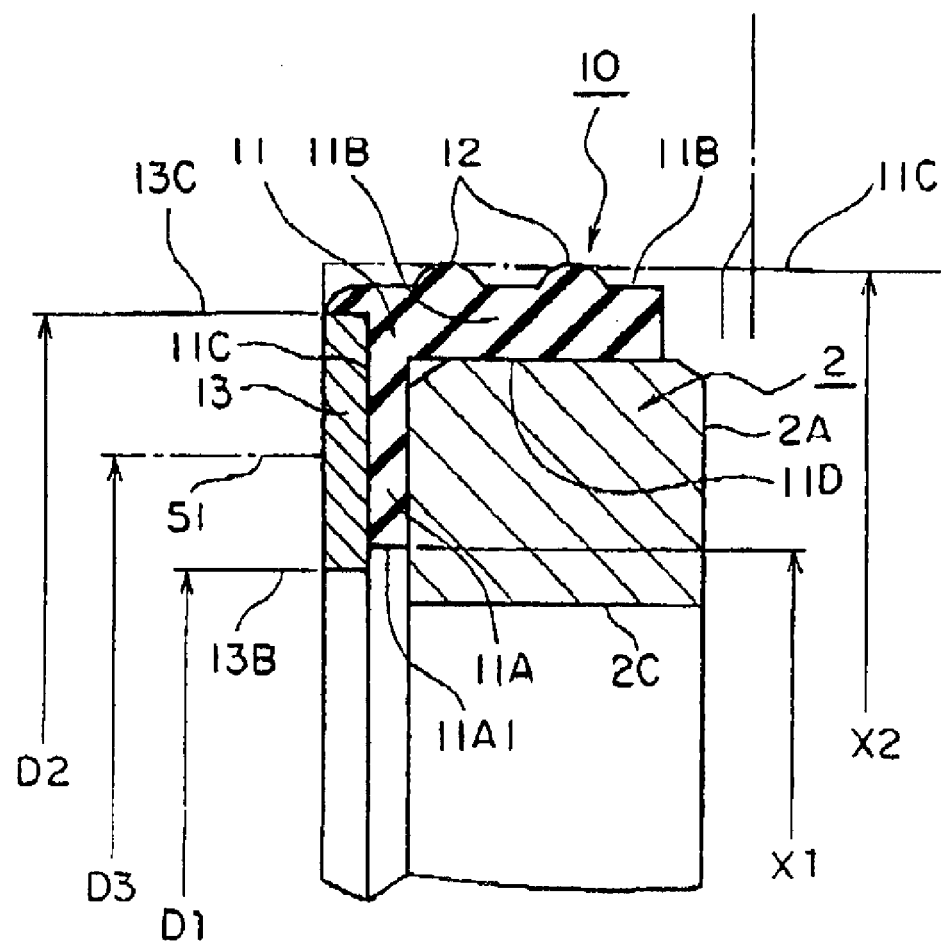
FIG. 3 is a half cut-away sectional view of the assembled unit of a first seal ring 2 and a cup gasket 10 before installation in the mechanical shaft seal device 1 shown in FIG. 2.
Figure 4:
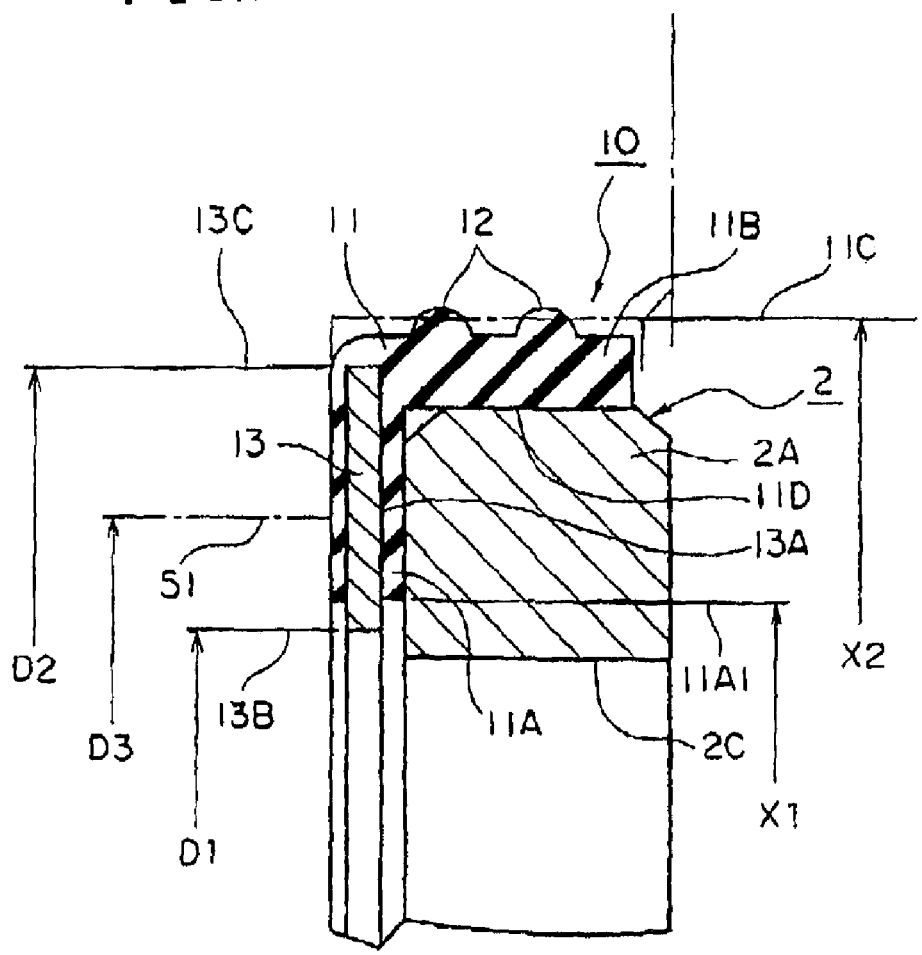
FIG. 4 is a half cut-away sectional view of the assembled unit of a first seal ring 2 and a cup gasket 10 before installation as a third embodiment related to the present invention.

FIG. 4 shows a cup gasket 10 as a third embodiment related to the present invention. The cup gasket 10 has a similar construction to the one shown in FIG. 3. What makes them different is that the support plate 13 is located in the lower pressure side B relative to the holed bottom plate 11A such that the support plate 13 and the holed bottom plate 11A contact with each other.

This arrangement of the cup gasket 10 allows the support plate 13 to be integrally molded with the holed bottom plate 11A by means of vulcanizing adhesion. Also the support plate 13 can be made of soft aluminum or synthetic resin. The diameter of the inner diameter surface 13B of the support plate 13 should preferably be in a range of from the diameter of the inner diameter surface 25 of the first seal ring 2 to the diameter D3 of the inner diameter surface 51 of the through hole.

Figure 5:
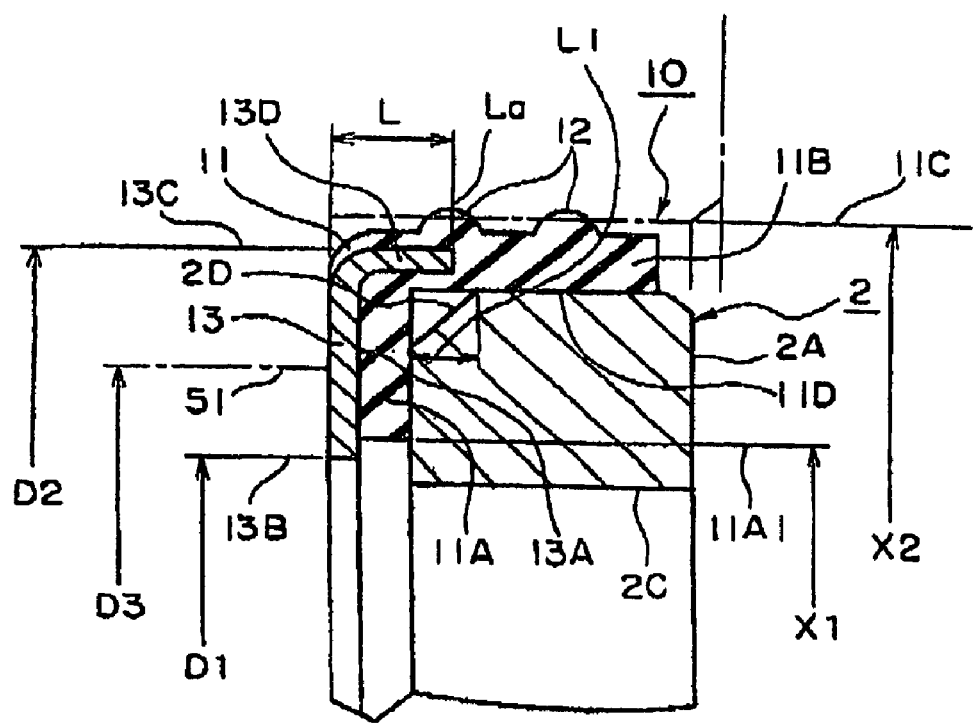
FIG. 5 is a half cut-away sectional view of the assembled unit of a first seal ring 2 and a cup gasket 10 before installation as a fourth embodiment related to the present invention.
Figure 6:
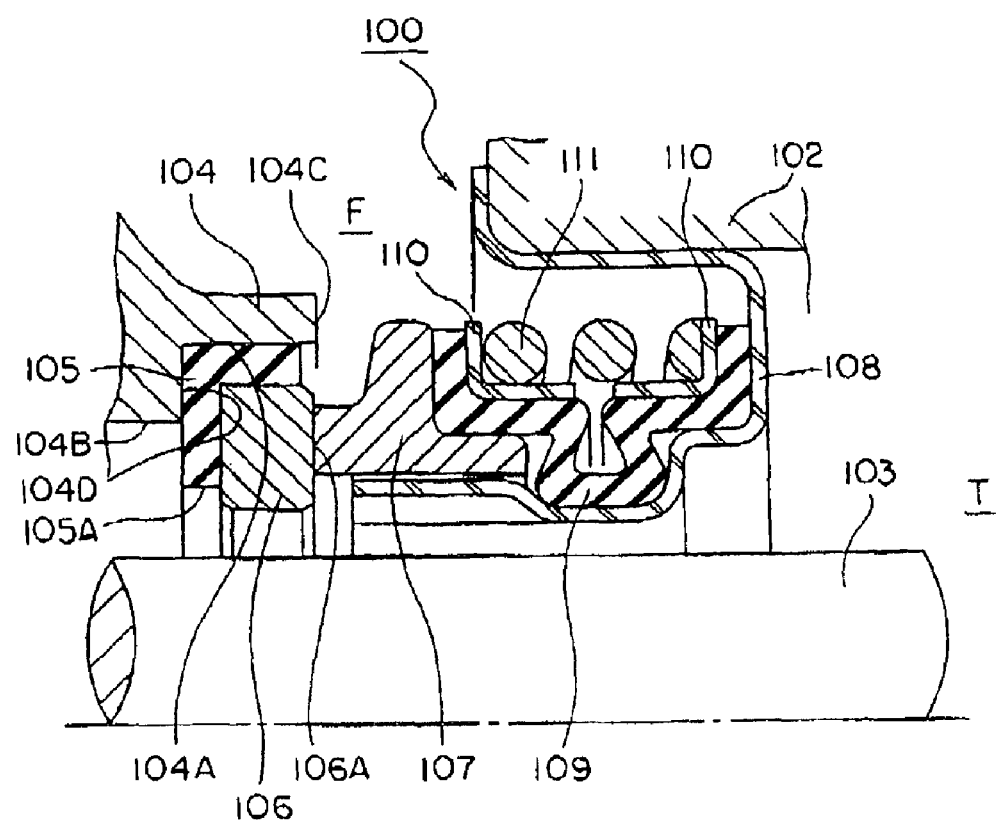
FIG. 6 is a half cut-away sectional view of a mechanical seal device as a relative art of the present invention.
Figure 7:
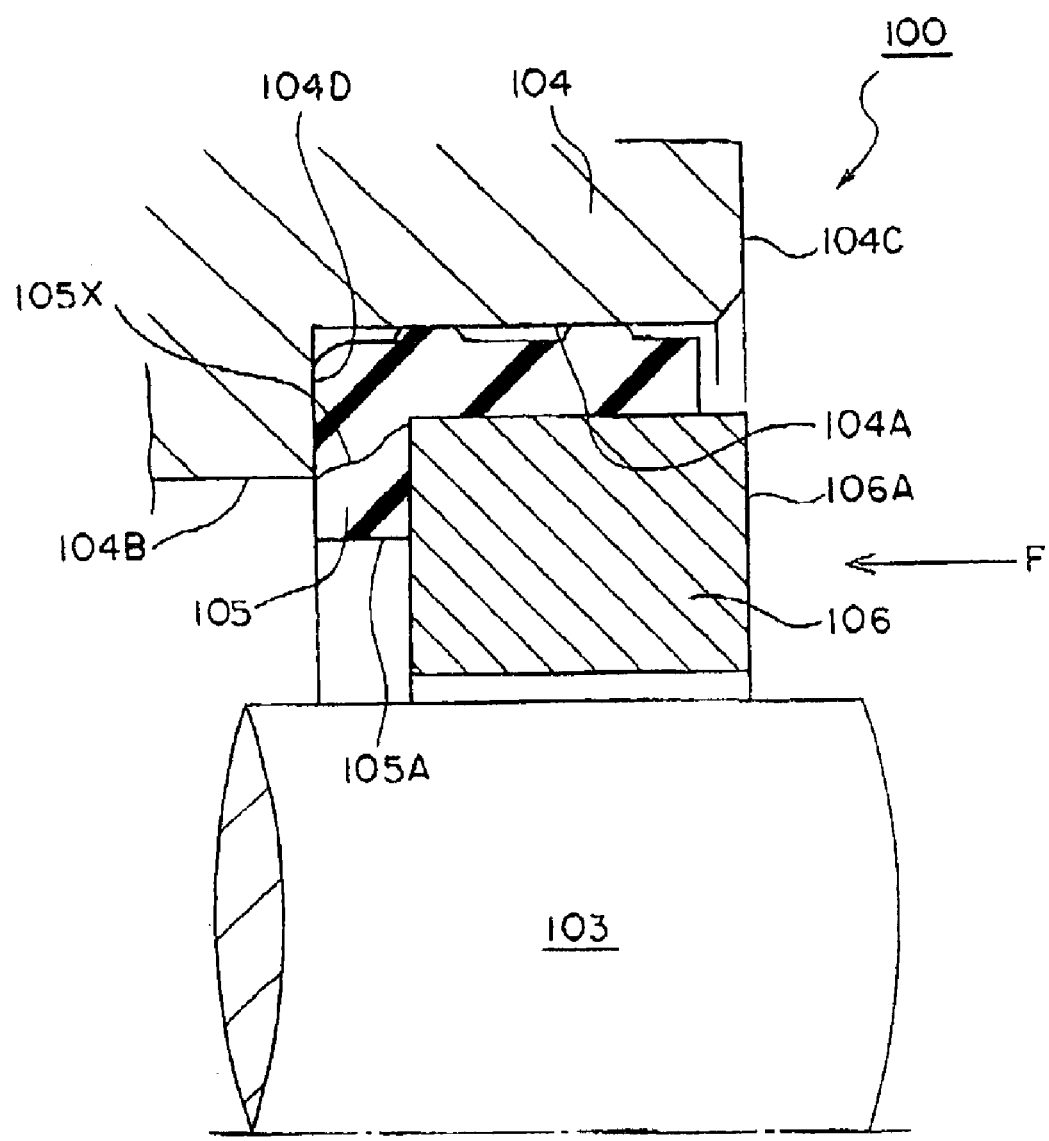
FIG. 7 is a half cut-away sectional view of the assembled unit of a first seal ring 2 and a cup gasket 10 of a relative art.

FIG. 5 shows a cup gasket 10 as a fourth embodiment related to the present invention.

What makes different in the cup gasket 10 in FIG. 5 from the one in FIG. 3 is that the support plate 13 retains a cylindrical wall 13D in its outer circumferential portion. The length L to the end face La of the cylindrical wall 13D is preferably not to exceed the axial length L1 of the chamfered edge 2D on the outer circumferential surface of the first seal ring 2. Presence of the cylindrical wall 13D simplifies the insertion of the cup gasket 10. Also the cylindrical wall 13D of the support plate 13 supports the cylindrical tube portion 11B providing for the improved seal performance of the cup gasket 10 against the step shoulder installation surface 50A.

Furthermore, the cup gasket 10 enhances the retainability with respect to the first seal face 2A of the first seal ring 2.

Preferred embodiments of the other inventions related to the present invention will be described next.

In a mechanical seal device 1 related to a second invention, the diameter of the inner diameter surface 13B of the support plate 13 is in a range of from the diameter of the inner diameter surface 2C of the first seal ring 2 to the diameter of the inner diameter surface 51 of the through hole which extends through the step shoulder installation surface 50A.

In the mechanical seal device 1 related to the second invention, the diameter of the inner diameter surface 13B of the support plate 13 disposed in the cup gasket 10 is made smaller than the diameter of the inner diameter surface 51 of the through hole extending through the step shoulder installation surface 50A. Therefore, reinforcing a resilient rubber material of the cup gasket 10 effectively prevents a crack formation from the outer diameter surface 2B2 of the first seal ring 2 toward the inner diameter surface 51 of the through hole of the step shoulder installation portion 50A.

In a mechanical seal device 1 related to a third invention, the support plate 13 retains a cylindrical wall 13D in its outer circumferential portion of the circular plate and the length L of the cylindrical wall 13D does not exceed the axial length L1 of the chamfered corner 2D on the outer circumferential edge of the first seal ring 2.

In the mechanical seal device 1 related to the third invention, the cylindrical wall 13D disposed in the support plate 13 makes it easy to insert the cup gasket 10 into the step shoulder installation portion 50A. Therefore, the outer circumferential mating face 11C of the cup gasket 10 can maintain a sealing contact with the step shoulder installation surface 50A, which improves the seal performance of the cup gasket 10.

Moreover, the cylindrical wall 13D provides the outer circumferential mating face 11C with a necessary support for maintaining a sufficient seal performance. The support plate 13 disposing the cylindrical wall 13D further gives reinforcement to the overall structure of the cup gasket 10. Therefore, not only a significant pressure resistance is achieved but also the first seal face 2A of the first seal ring 2 is firmly pressed against the opposing second seal face 3A for a sealing contact.

Next, functions and effects provided by a mechanical seal device 1 related to the present invention will be described.

According to the mechanical seal device 1 related to the present invention, the support plate 13 integrally adhered to the cup gasket which is made of a resilient rubber material ensures that the contact face 2B of the first seal ring 2 not only exhibits a sealing contact relative to the step shoulder installation surface 50A but also is supported in a resilient manner. This enables the first seal face 2A of the first seal ring 2 to form a sealing contact with the opposing second seal face 3A of the second seal ring 3.

As a result, uneven wear of the respective seal faces is prevented.

Also the support plate 13 disposed in the cup gasket 10 provides the first seal ring 2 with a firm support against the process fluid pressure exerted to the seal ring 2.

As a consequence, damage to the cup gasket 10 can effectively be avoided.

Since the outer circumferential mating surface 11C of the cup gasket 10 is not affected by the support plate 13, the surface 11C is able to establish a sealing contact with the step shoulder installation surface 50A by fully utilizing its resilient nature.

The seal performance of the outer circumferential mating portion will be ensured accordingly.

Furthermore, the main body 11 of the cup gasket 10 is provided with reinforcement by the support plate 13 integrally disposed in the cup gasket 10 whose inner diameter surface 13B is arranged smaller than the inner diameter surface 51 of the through hole extending through the step shoulder installation surface 50A.

As a result, a crack formation in the cup gasket is prevented.

Moreover, in the mechanical seal device 1 related to the present invention, the cylindrical wall 13D disposed in the support plate 13 makes mating the first seal ring 2 with the cup gasket 10 easy. The cylindrical wall 130 also makes it very easy to insert the cup gasket 10 into the step shoulder installation surface 50A without damaging the gasket 10. This ensures that the step shoulder installation surface 50A and the outer circumferential mating surface 11C of the cup gasket 10 are kept in a sealing contact relation.

As a consequence, the seal performance of the cup gasket will be improved.

In addition, even if a process fluid pressure acts on the cylindrical tube portion 11B of the cup gasket 10, the cylindrical wall 13D provides a support for the cylindrical tube portion 11B in an axial direction. Therefore, the seal performance of the cylindrical tube portion 1B is increased. Also a total support for the cup gasket 10 provided by the cylindrical wall 13D and the support face 13A not only enhances the pressure resistance of the cup gasket 10 but also keeps the first seal face 2A of the first seal ring 2 and the opposing second seal face 3A of the second seal ring 3 in parallel with each other for a better seal performance.

This leads to an enhanced seal performance of the seal faces and prevention of irregular wear of the seal faces.

Having described specific embodiments of the invention however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A mechanical seal device for providing a seal between a high pressure process fluid side and a lower pressure side by developing a sealing contact between two seal faces of a first seal ring mounted on a rotary body and a second seal ring installed in a seal housing, said mechanical seal device comprising:

a) a mating surface being retained by one of said seal rings and being fixedly installed in a step shoulder installation surface comprised of a radially extending surface and an axially extending circumferential surface;

b) a seal face being located on the opposite side relative to said mating surface;

c) a cup gasket being disposed between said mating surface of said seal ring and said step shoulder installation surface, a main body of said cup gasket being made of a resilient rubber material; and d) a support plate being disposed in the main body of said cup gasket in an integral manner, a support face of said support plate facing opposite relative to and approximately parallel with said mating surface of said seal ring;

wherein a diameter of said support plate in said cup gasket extends in a range of from a diameter of an inner diameter surface of said seal ring to the diameter of an inner diameter surface of a through hole extending through said step shoulder installation surface; and wherein an inner diameter of said support plate in said cup gasket is smaller than an inner diameter of the main body of said cup gasket.

2. A mechanical seal device for providing a seal between a high pressure process fluid side and a lower pressure side by developing a sealing contact between two seal faces of a first seal ring mounted on a rotary body and a second seal ring installed in a seal housing, said mechanical seal device comprising:

a) a mating surface being retained by one of said seal rings and being fixedly installed in a step shoulder installation surface comprised of a radially extending surface and an axially extending circumferential surface;

b) a seal face being located on the opposite side relative to said mating surface;

c) a cup gasket being disposed between said mating surface of said seal ring and said step shoulder installation surface a main body of said cup gasket being made of a resilient rubber material; and d) a support plate being disposed in the main body of said cup gasket in an integral manner, a support face of said support plate facing opposite relative to and approximately parallel with said mating surface of said seal ring;

wherein said main body of said cup gasket comprises a holed bottom plate supported by said support plate.

3. A mechanical seal device as claimed in claim 2, wherein said support plate is embedded in said holed bottom plate.

4. A mechanical seal device as claimed in claim 1 or 2 wherein said support plate retains a cylindrical wall in an outer circumferential portion of the support plate and the length of said cylindrical wall does not exceed the axial length of a chamfered corner located at an outer circumferential edge of said seal ring.

* * * * *